(12) United States Patent
Niu et al.

(10) Patent No.: US 9,993,070 B2
(45) Date of Patent: Jun. 12, 2018

(54) INTEGRAL INTELLIGENT DESKTOP DEVICE

(71) Applicant: BOE TECHNOLOGY GROUP CO., LTD., Beijing (CN)

(72) Inventors: Bei Niu, Beijing (CN); Wei Wei, Beijing (CN); Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/113,400

(22) PCT Filed: Oct. 9, 2015

(86) PCT No.: PCT/CN2015/091538
§ 371 (c)(1),
(2) Date: Jul. 21, 2016

(87) PCT Pub. No.: WO2016/197492
PCT Pub. Date: Dec. 15, 2016

(65) Prior Publication Data
US 2017/0143112 A1 May 25, 2017

(30) Foreign Application Priority Data

Jun. 8, 2015 (CN) .......................... 2015 2 0386870

(51) Int. Cl.
| | |
|---|---|
| G03B 21/00 | (2006.01) |
| A47B 21/007 | (2006.01) |
| A47B 13/08 | (2006.01) |
| A47B 21/04 | (2006.01) |
| G03B 21/14 | (2006.01) |
| G03B 29/00 | (2006.01) |
| G02F 1/1333 | (2006.01) |

(52) U.S. Cl.
CPC .......... A47B 21/007 (2013.01); A47B 13/081 (2013.01); A47B 21/04 (2013.01);
(Continued)

(58) Field of Classification Search
CPC ........ G03B 21/00; G02F 2001/133331; G02B 21/145; A47B 21/04
(Continued)

(56) References Cited

U.S. PATENT DOCUMENTS

| | | | |
|---|---|---|---|
| 6,937,468 B2 * | 8/2005 | Lin ....................... | G06F 1/1632 361/679.41 |
| 2005/0030494 A1 * | 2/2005 | Kumai ................... | A47B 37/02 353/119 |

(Continued)

FOREIGN PATENT DOCUMENTS

| | | |
|---|---|---|
| CN | 201557752 U | 8/2010 |
| CN | 203013010 U | 6/2013 |

(Continued)

OTHER PUBLICATIONS

International Search Report and Written Opinion dated Mar. 11, 2016, for corresponding PCT Application No. PCT/CN2015/091538.

*Primary Examiner* — Steven H Whitesell Gordon
*Assistant Examiner* — Jerry Brooks
(74) *Attorney, Agent, or Firm* — Kinney & Lange, P.A.

(57) ABSTRACT

Disclosed is an integral intelligent desktop device comprising: a desktop portion; a display unit connected with the desktop portions with a surface of the desktop portion forming a desktop of the integral intelligent desktop device with a surface of the display unit together; a projection unit performing a projection display of displayed content of the display unit; a process unit electrically connected with the display unit and the projection unit, wherein the projection unit is built in the display unit, and the display unit is movable and/or rotatable relative to the desktop portion.

13 Claims, 3 Drawing Sheets

(52) U.S. Cl.
CPC ............ *G03B 21/145* (2013.01); *G03B 29/00* (2013.01); *G02F 1/13338* (2013.01); *G02F 2001/133331* (2013.01)

(58) Field of Classification Search
USPC ........................................................ 353/122
See application file for complete search history.

(56) References Cited

U.S. PATENT DOCUMENTS

| | | | |
|---|---|---|---|
| 2006/0082518 A1* | 4/2006 | Ram | .................. G06F 1/1601 345/1.1 |
| 2011/0235915 A1 | 9/2011 | Yamaguchi | |
| 2014/0028984 A1* | 1/2014 | Osaka | ................ G03B 21/2013 353/31 |
| 2014/0152890 A1* | 6/2014 | Rayner | ................. G06F 1/1626 348/376 |
| 2015/0286254 A1* | 10/2015 | Hung | .................... G06F 1/1645 345/173 |

FOREIGN PATENT DOCUMENTS

| | | |
|---|---|---|
| CN | 204257014 U | 4/2015 |
| CN | 204670627 U | 9/2015 |
| WO | 9847406 A2 | 10/1998 |

* cited by examiner

INTEGRAL INTELLIGENT DESKTOP DEVICE

CROSS-REFERENCE TO RELATED APPLICATION

This application in a national phase application of the PCT international application no. PCT/CN2015/091538 and claims the benefit of Chinese Patent Application No. 201520386870.7 filed on Jun. 8, 2015 in the State Intellectual Property Office of China, the whole disclosure of which is incorporated herein by reference.

BACKGROUND OF THE INVENTION

Field of the Invention

Embodiments of the present invention relate to an integral intelligent desktop device, in particular to an integral intelligent desktop device which is able to combine a desktop display with a projection display.

Description of the Related Art

An intelligent desktop is a desktop device using intelligent technology and having multi-functions. It integrates multiple functions including display, entertainment, article placement and the like and has born with the development of smart home. The intelligent desktop can realize various functions by means of internet technology, integrates multi-touch, liquid crystal display and software systems, and is operated by a touch system. Various operations can be performed by touching a touch panel conveniently. The intelligent desktop is equipped with a system maintenance operation so that an operator can update and maintain various data in time.

The existing intelligent desktop is only restricted to a desktop display and a display form is single, especially cannot suit for a multi-person operation occasion. Further, a desktop display position of the existing intelligent desktop is stationary, and the display position is not able to be adjusted according to different application occasions. Therefore, the existing intelligent desktop cannot meet the demand of users.

SUMMARY OF THE INVENTION

An object of the present invention is intended to solve at least one of the above issues and defects existing in the prior art and to combine a desktop display with a projection display so as to greatly extend applicable range of an intelligent desktop.

According to one aspect of the present invention, there is provided an integral intelligent desktop device comprising: a desktop portion; a display unit connected with the desktop portion, a surface of the desktop portion forming a desktop of the integral intelligent desktop device with a surface of the display unit together; and a projection unit performing a projection display of displayed content of the display unit, wherein the projection unit is built in the display unit.

According to an exemplary embodiment of the present invention, the integral intelligent desktop device further comprises a process unit electrically connected with the display unit and the projection unit.

According to an exemplary embodiment of the present invention, the display unit is connected with the desktop portion at a side portion thereof and is moveable and/or rotatable relative to the desktop portion.

According to another exemplary embodiment of the present invention, the display unit is a multi-touch liquid crystal display screen, a screen surface of which is toughened to bear loads and resist water so as to realize "desktop" function.

According to yet another exemplary embodiment of the present invention, the display unit is a multi-touch liquid crystal display screen, and the projection unit comprises a light source, a condenser, a color disk, a relay lens, a reflecting mirror (DMD) and a projection lens and is built in an upper end portion of the display unit.

According to still another exemplary embodiment of the present invention, the desktop portion is provided with a guide rail on the side portion thereof; the display unit is provided with a roller on a side portion thereof; and the display unit is movable relative to the desktop portion by cooperation between the roller and the guide rail.

According to yet another exemplary embodiment of the present invention, the display unit is rotatable about a central axis of the roller so that the display unit is rotatable relative to the desktop portion.

According to still another exemplary embodiment of the present invention, the roller is provided with a center hole in a center portion thereof; and a cable for connecting the process unit with the display unit and the projection unit passes through the center hole. With this arrangement, it is possible to prevent the cable from being scratched and at the same time to keep the desktop portion clear and neat.

According to yet another exemplary embodiment of the present invention, the process unit is placed in an internal space of the desktop portion. With this arrangement, it is possible to maximally make use of space and at the same time to further keep the desktop portion clear and neat.

In the above various embodiments of the present invention, it is possible to maximally make use of the intelligent desktop device by combining the display unit, the projection unit and the desktop portion.

In addition, the display unit is movable and rotatable so that display positions are more flexible to allow the integral intelligent desktop device of the present invention to be applied in various occasions so as to greatly extend the applicable range thereof.

Other objects and advantages of the present invention will be apparent by the following description with reference to the accompanying drawings and will be helpful for a comprehensive understanding to the present invention.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
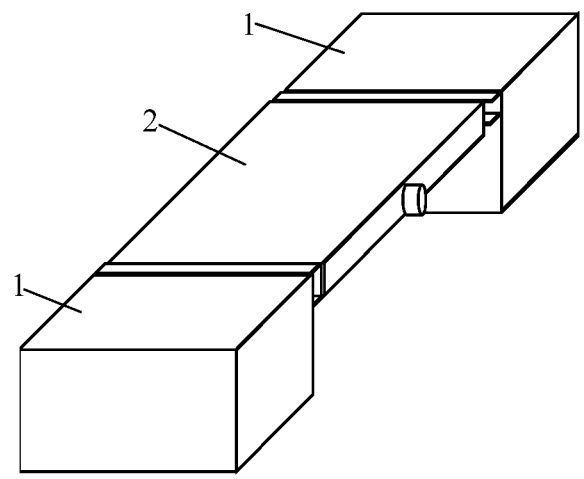
FIG. 1 is a schematic assembly view of an integral intelligent desktop device according to an exemplary embodiment of the present invention.

Technical solutions of the present invention will be further specifically described hereinafter with reference the accompanying drawings in exemplary embodiments of the present invention. In the description, the same or similar reference numerals refer to the same or similar components. The description to the embodiments of the present invention hereinafter with reference to the attached drawings is intended to explain the general inventive idea of the present invention and should not be construed as being limited to the present invention.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an general inventive concept of the present invention, there is provided an integral intelligent desktop device comprising: a desktop portion; a display unit connected with the desktop portion, a surface of the desktop portion forming a desktop of the integral intelligent desktop device with a surface of the display unit together; a projection unit performing a projection display of displayed content of the display unit; and a process unit electrically connected with the display unit, wherein the projection unit is built at least partly in the display unit.

Figure 2:
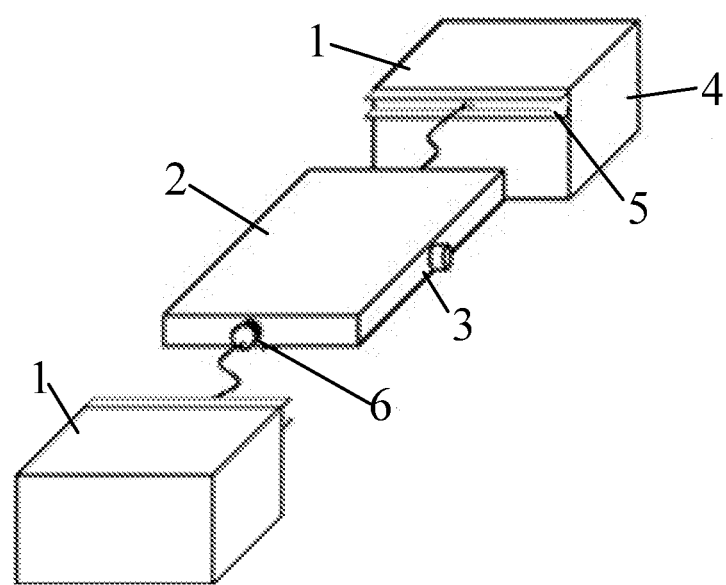
FIG. 2 is a schematic exploded view of the integral intelligent desktop device according to an exemplary embodiment of the present invention.

FIGS. 1 and 2 are schematic assembly view and exploded view of an integral intelligent desktop device according to an exemplary embodiment of the present invention, respectively.

As shown in FIGS. 1 and 2, in the illustrated embodiment, the integral intelligent desktop device mainly comprises a desktop portion 1, a display unit 2 and a projection unit 3.

As depicted in FIG. 1, the display unit 2 is located between desktop portions 1 at both sides thereof, and the desktop portions 1 may be assembled and connected with the display unit 2. In this state, upper surfaces of the desktop portions at either side of the display unit 2 and an upper surface of the middle display unit 2 form a flat surface, i.e., a desktop, which may be used as a desktop for a common tea table, a council board, a desk and the like. The desktop portions 1 are made of materials for producing the common tea table. For example, the desktop portions may be made of wood or toughened glass. The display unit 2 may be a liquid crystal display screen such as a multi-touch liquid crystal display screen, and more particularly a 20-touch LCD screen. A screen of the display screen may be toughened to realize load-bearing, water proof functions and the like.

Figure 5:
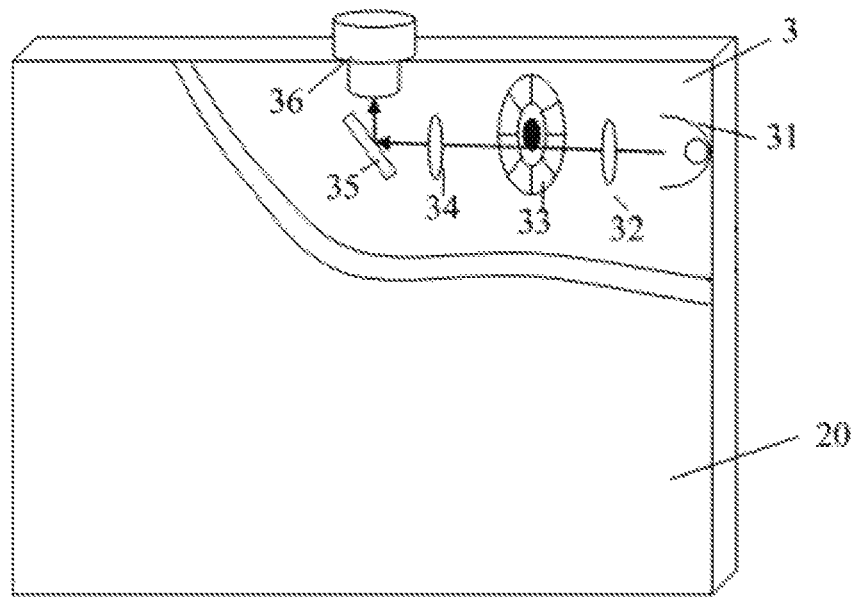
FIG. 5 is a schematic view showing the display unit and a projection unit built in the display unit according to an exemplary embodiment of the present invention.

According to an exemplary embodiment of the present invention, the projection unit 3 is built in the display unit 2. Specifically, as shown in FIG. 5, in this embodiment, the display unit 2 includes a multi-touch film 20. The projection unit 3 includes a light source 31, a condenser 32, a color disk 33, a relay lens 34, a reflecting mirror (DMD) 35 and a projection lens 36 sequentially arranged along a light path.

In FIG. 5, the projection unit 3 is built in an upper end portion of the display unit 2 so that the projection lens 36 protrudes from an upper side of the display unit. With this arrangement, the projection unit 3 can perform a projection display of displayed content of the display unit 2 such that the integral intelligent desktop device can not only realize the display of the common display screen through the display unit, but also realize the projection display through the projection unit.

In addition, as shown in FIG. 2, the illustrated integral intelligent desktop device further comprises a process unit 4 which can drive the display unit and the projection unit to perform the display and process interactive information on the display screen such as the multi-touch liquid crystal screen in real. According to an exemplary embodiment of the present invention, as shown in FIG. 2, the process unit 4 is placed in an internal space of the desktop portion 1 at either side of the display unit.

According to an exemplary embodiment of the present invention, as shown in FIGS. 2, 3, 4 and 6, the display unit 2 is moveable/ratable relative to the desktop portion 1.

As an exemplary embodiment, as depicted in FIG. 2, the display unit 2 is connected with the desktop portions 1 by guide rails and roller mechanisms. Specifically, the desktop portions 1 located at either side of the display unit are provided with guide rails 5 on one side thereof near the display unit 2, and the display unit 2 is provided with rollers 6 on both sides thereof at which the display unit 2 is connected with the desktop portions 1.

Figure 6:
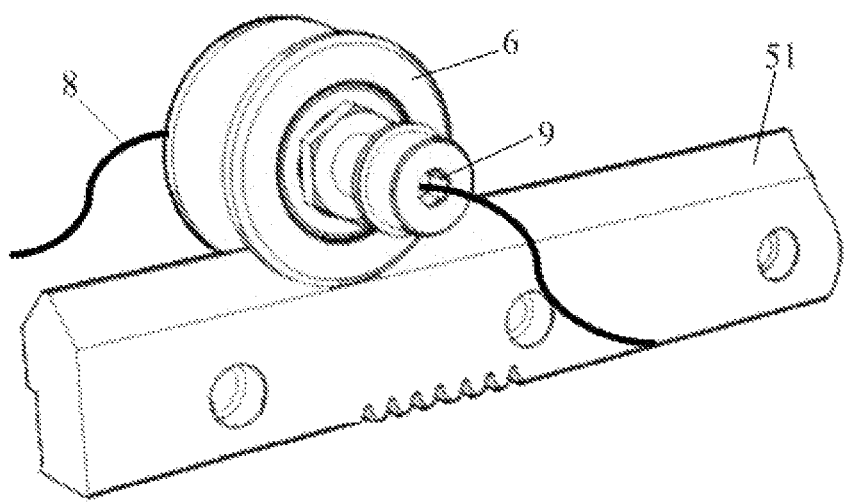
FIG. 6 shows a detailed view of the guide rail and the roller cooperated with each other according to an exemplary embodiment of the invention.

FIG. 6 shows a detailed view of the guide rail and the roller cooperated with each other according to an exemplary embodiment of the invention. As shown in FIG. 6, the guide rail 5 includes a protruding portion 51 engaged with a recess in the roller 6. With this protrusion-recess-engagement structure, the roller 6 can smoothly and stably slide on the guide rail 5 so as to realize a movement of the display unit 2 relative to the desktop portions 1.

Referring to FIG. 6 again, the roller 6 further includes a roller carrier, a center shaft and a bearing located therebetween. The center shaft is ratable relative to the roller carrier through the bearing, so that the display unit 2 is ratable relative to the desktop portion 1.

Figure 3:
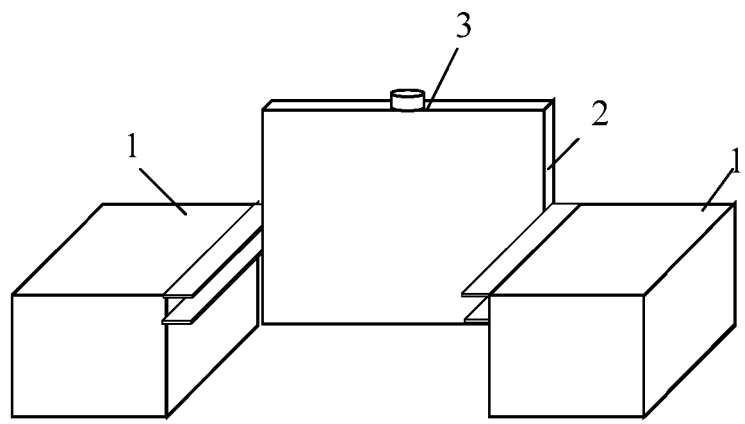
FIG. 3 is a schematic view showing a state in which the display unit rotated relative to the desktop portion by 90° according to an exemplary embodiment of the present invention.

FIG. 3 is a schematic view showing a state in which the display unit is rotated by 90° relative to the desktop portion according to an exemplary embodiment of the present invention. In this state, the display screen of the display unit 2 itself may be used as a projection screen or a display screen for viewing by a user.

Figure 4:
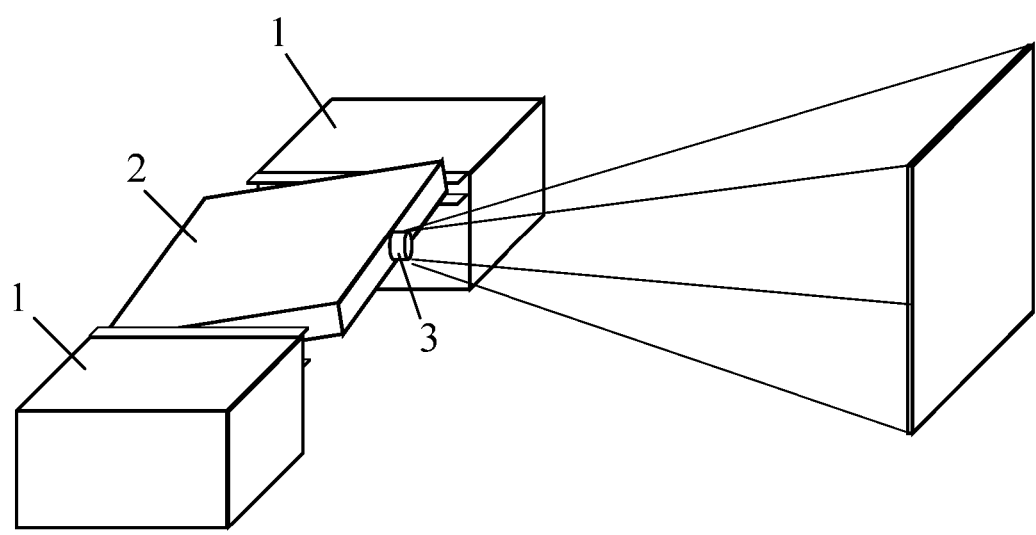
FIG. 4 is a schematic view showing a state in which the display unit performs a projection display after being rotated by a predetermined angel relative to the desktop portions according to an exemplary embodiment of the present invention.

FIG. 4 is a schematic view showing a state in which the display unit performs a projection display after being rotated relative to the desktop portions by a predetermined angel according to an exemplary embodiment of the present invention. In this embodiment, the display unit is rotatable relative to the desktop portions by any angle between 0-360°. According to other embodiments, the display unit 2 is rotatable relative to the desktop portions by any angle between 0-180°. Alternatively, the display unit 2 is rotatable relative to the desktop portions by any angle between 0-90°. As shown in FIG. 4, the specific rotation angle may be 15°. Under this angle, the display content of the display unit 2 may be better projected onto a wall or a screen located on the right side through the projection unit 3.

Further, as shown in FIG. 6, the roller 6 is also provided with a center hole 9 through which a cable or cables for connecting the process unit 4 with the display unit 2 and the projection unit 3 can pass. With this arrangement, it is possible to prevent the cable from being scratched and at the same time to keep the desktop portions clear and neat to a maximum extent.

The integral intelligent desktop device integrating with the display and the projection unit according to the above embodiments of the present invention can realize a multi-function such as desktop, display and projection functions, so that the utilization of the intelligent desktop device is maximized. At the same time, the display unit is movable and rotatable by the guide rail-and-roller structure so that display position are variable, thereby greatly extending an applicable range thereof. For example, the integral intelligent desktop device according to the above embodiments of the present invention may be applied but not limited to the following applications:

(1) serve in all walks of life: the intelligent desktop can serve for various trades such as KTV selecting song, catering ordering systems, self-service business handling of communication business and financial institutions, estate/car presale, wedding photography exhibition, information introduction of tourist spot/museum/science and technology museum and the like.

(2) interactive entertainment function: the intelligent desktop can perform multi-touch interactive games to allow multiple persons to play the same game together so as to increase entertainment and interactivity. The intelligent desktop has high touch sensitivity and can be compatible for multi-touch standards and can recognize more than a hundred touch points simultaneously so that multi-person operations are not interfered with each other by using advanced optical interactive induction imaging technology.

(3) various kinds of built-in software supporting: the intelligent desktop has satisfied basic function requirements in different occasions such as multimedia material display, product introduction and marketing, introduction of associated knowledge, electronic teaching, meeting, reporting, broadcasting and the like by built-in electronic whiteboard, electronic reading, 3D map, multimedia browsing, enhanced PPT showing and other functions without developing any other relevant software.

(4) network connection: the intelligent desktop may be interconnected with digital devices such as mobile phones, tablets, cameras and the like through internet to realize wireless switching. It can also browse relevant web pages to obtain desired information, for example to inquiry neighboring information and enjoy convenience services.

(5) expanding function: the intelligent desktop can be re-developed for other applications according to requirements of users with available design ports.

Although the present invention has been described with reference to the accompanying drawings, the embodiments disclosed in the accompanying drawings is intended to illustrate the preferable embodiments of the present invention, rather than being construed as a limitation to the present invention.

Although some embodiments of the general concept of the present invention have been illustrated and described, it should be understood by those skilled in the art that modification can be made to these embodiments without departing from the principle and spirit of the present invention. The scope of the present invention is defined by claims and their equivalents.

It should be noted that phase "comprise" or "include" does not exclude other elements or steps, and the phrase "a" or "an" does not exclude multiple. In addition, any reference numerals in claims should not be construed as limiting the scope of the present invention.

What is claimed is:

1. An integral intelligent desktop device comprising:
   a desktop portion comprising a top surface and at least a side surface perpendicular to the top surface;
   a display unit connected with the desktop portion, the top surface of the desktop portion and a top surface of the display unit together forming a desktop of the integral intelligent desktop device; and
   a projection unit configured to perform a projection display of displayed content of the display unit,
   wherein the projection unit is at least partially built in the display unit, the display unit is connected with the side surface of the desktop portion at a side surface of the display unit and is moveable on the side surface of the desktop portion in a direction parallel to the top surface of the desktop portion and rotatable relative to the desktop portion, and
   wherein the desktop portion is provided with a guide rail on the side surface thereof; and
   wherein the display unit is provided with a roller on the side surface thereof; and
   wherein the display unit is movable along the guide rail relative to the desktop portion through cooperation of the roller and the guide rail.

2. The integral intelligent desktop device according to claim 1, wherein the integral intelligent desktop device further comprises a process unit electrically connected with the display unit and the projection unit.

3. The integral intelligent desktop device according to claim 2, wherein the process unit is placed in an internal space of the desktop portion.

4. The integral intelligent desktop device according to claim 2, wherein the display unit is rotatable about a central axis of the roller so that the display unit is rotatable relative to the desktop portion.

5. The integral intelligent desktop device according to claim 4, wherein:
   the roller is provided with a center hole in a central portion thereof; and
   a cable for connecting the process unit with the display unit and the projection unit passes through the center hole.

6. The integral intelligent desktop device according to claim 4, wherein the process unit is placed in an internal space of the desktop portion.

7. The integral intelligent desktop device according to claim 4, wherein the integral intelligent desktop device comprises two desktop portions located at either side of the display unit.

8. The integral intelligent desktop device according to claim 2, wherein:
   the roller is provided with a center hole in a central portion thereof; and
   a cable for connecting the process unit with the display unit and the projection unit passes through the center hole.

9. The integral intelligent desktop device according to claim 8, wherein the process unit is placed in an internal space of the desktop portion.

10. The integral intelligent desktop device according to claim 1, wherein the display unit is a multi-touch liquid crystal display screen, a screen surface of which is toughened to bear loads and resist water.

11. The integral intelligent desktop device according to claim 1, wherein the projection unit comprises a light source, a condenser, a color disk, a relay lens, a reflecting mirror and a projection lens, wherein the light source, the condenser, the color disk, the relay lens and the reflecting mirror are built in the display unit, and the projection lens partially protrudes from an upper side of the display unit.

12. The integral intelligent desktop device according to claim 1, wherein the integral intelligent desktop device comprises two desktop portions located at either side of the display unit.

13. The integral intelligent desktop device according to claim 1, wherein the display unit is rotatable about a central axis of the roller so that the display unit is rotatable relative to the desktop portion.

* * * * *